United States Patent
Cheng et al.

(10) Patent No.: US 9,128,988 B2
(45) Date of Patent: Sep. 8, 2015

(54) SEARCH RESULT RANKING BY DEPARTMENT

(71) Applicant: Wal-Mart Stores, Inc., Bentonville, AR (US)

(72) Inventors: Jinxing Cheng, Palo Alto, CA (US); Abhishek Gattani, Sunnyvale, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 192 days.

(21) Appl. No.: 13/840,263

(22) Filed: Mar. 15, 2013

(65) Prior Publication Data

US 2014/0280112 A1 Sep. 18, 2014

(51) Int. Cl.
*G06F 17/30* (2006.01)
*G06Q 30/00* (2012.01)

(52) U.S. Cl.
CPC ...... *G06F 17/3053* (2013.01); *G06F 17/30864* (2013.01); *G06Q 30/00* (2013.01)

(58) Field of Classification Search
USPC .......................................................... 707/728
See application file for complete search history.

(56) References Cited

U.S. PATENT DOCUMENTS

| | | | |
|---|---|---|---|
| 6,751,600 B1 * | 6/2004 | Wolin | 706/12 |
| 7,983,963 B2 | 7/2011 | Byrne | |
| 8,180,768 B2 | 5/2012 | Ceri | |
| 8,326,826 B1 | 12/2012 | Upstill | |
| 8,346,795 B2 | 1/2013 | Roulland | |
| 8,694,529 B1 * | 4/2014 | Hotchkies et al. | 707/766 |
| 8,849,830 B1 * | 9/2014 | Srinivasan et al. | 707/740 |
| 2003/0018659 A1 * | 1/2003 | Fuks et al. | 707/500 |
| 2005/0246332 A1 * | 11/2005 | Wang et al. | 707/3 |
| 2007/0094268 A1 * | 4/2007 | Tabe | 707/10 |
| 2007/0226082 A1 * | 9/2007 | Leal | 705/27 |
| 2008/0270154 A1 * | 10/2008 | Klots et al. | 705/1 |
| 2010/0082456 A1 * | 4/2010 | Chung | 705/27 |
| 2011/0225180 A1 * | 9/2011 | Liao et al. | 707/769 |
| 2013/0254059 A1 * | 9/2013 | Teo | 705/26.4 |

* cited by examiner

*Primary Examiner* — Cam-Linh Nguyen

(74) *Attorney, Agent, or Firm* — Bryan Cave LLP (57) ABSTRACT

Systems and methods are disclosed herein for providing search results, particularly product records from a product database. Past queries are analyzed and grouped into clusters according to similarities with one another. For an individual query, relevant search results are identified and departments corresponding thereto are also identified. Confidence scores are determined for the identified departments and if one or more departments have confidence scores above a threshold, the search results are filtered based thereon. If not, then departments corresponding to a query cluster relevant to the query are selected. Additional departments may also be selected based on the number of search results corresponding to the additional departments. Search results filtered according to one or more selected departments are transmitted to an author of the query.

16 Claims, 7 Drawing Sheets

SEARCH RESULT RANKING BY DEPARTMENT

BACKGROUND

1. Field of the Invention

This invention relates to systems and methods for responding to search queries, and, more particularly, to searches for products in a product database.

2. Background of the Invention

It is the goal of many online retailers to be a one-stop-shop for customers. Accordingly, the retailer may have a very large array of products. In order to better meet the needs of customers, many retailers also integrate products of other merchants into their websites, further increasing the number of products available. With so many products offered for sale, it can be difficult for a customer to find a desired product through a search. Many retailers offer free-form text searches of their product databases. However, the large number of products available provides many opportunities for matching but irrelevant products.

Accordingly, it would be an advancement in the art to provide an improved approach to performing product-based searches that increases the relevance of search results to a user.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
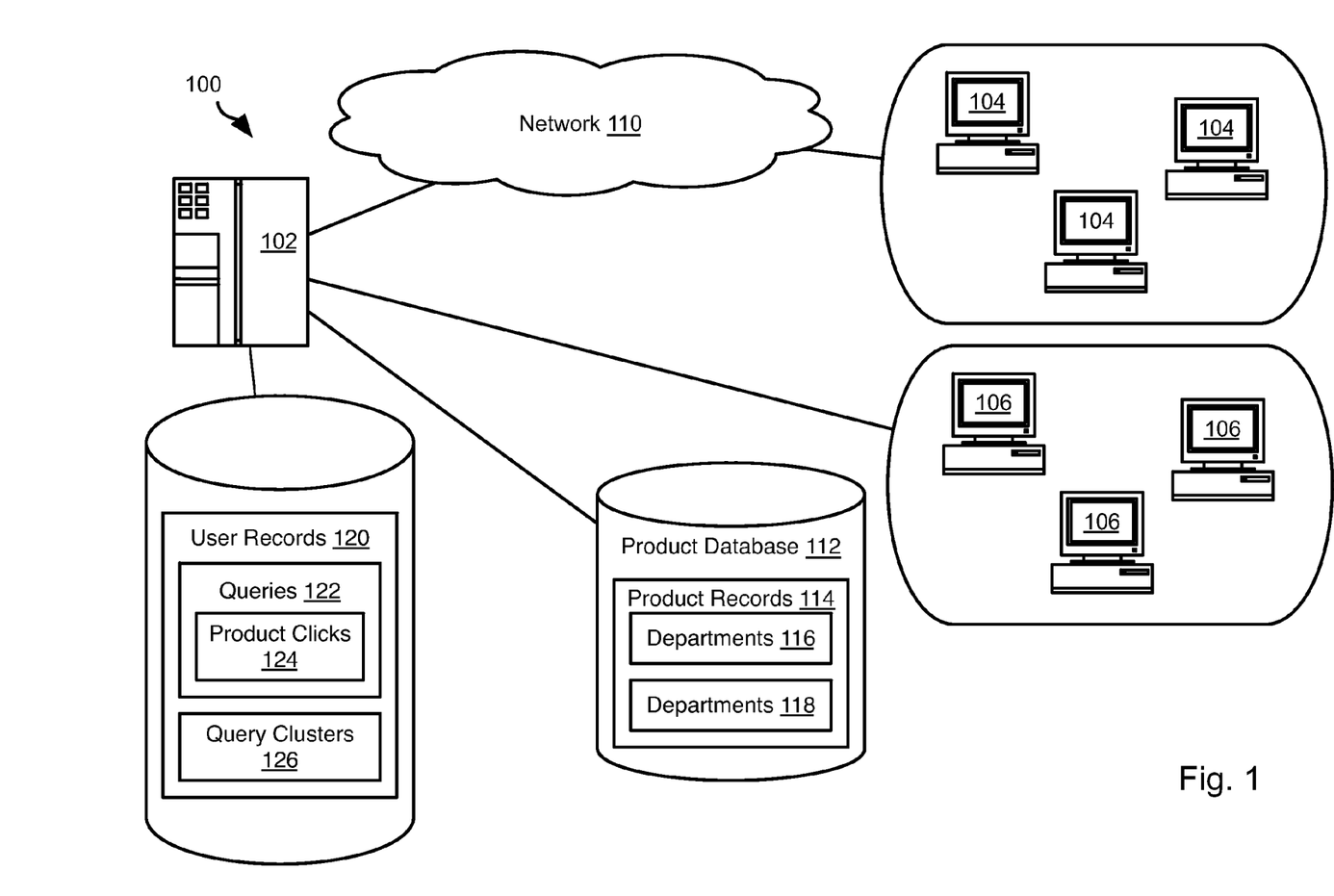
FIG. 1 is a schematic block diagram of a system for performing methods in accordance with embodiments of the present invention.

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more merchant workstations 104 and one or more customer workstations 106. In the methods disclosed herein, the merchant workstations 104 and customer workstations 106 may be embodied as mobile devices such as desktop computers or other computing device such as a mobile phone or tablet computer.

In some embodiments, some or all of the methods disclosed herein may be performed using a desktop computer or any other computing device as the merchant workstations 104 and customer workstations 106. For purposes of this disclosure, discussion of communication with a user or entity or activity performed by the user or entity (e.g. analyst, crowdsourcing community, merchant) may be interpreted as communication with a computer 104, 106 associated with the user or entity or activity taking place on a computer associated with the user or entity. The merchant workstations 104 may be viewed as a merchant computer network 104 whereby tasks to be performed by a merchant representative may be performed by any member of the population by means of logic implemented by the computer network, the server system 102, or some other entity.

Some or all of the server 102, merchant computers 104, and customer workstations may communicate with one another by means of a network 110. The network 110 may be embodied as a peer-to-peer connection between devices, a connection through a local area network (LAN), WiFi network, the Internet, or any other communication medium or system. Each of the populations 104, 106 of workstations may be coupled to one another by separate networks some or all of the three populations 104, 106 of workstations may share a common network. For example, in the illustrated embodiments, the merchant workstations and server system 102 may communicate over a separate private network, rather than over the network 110.

The server system 102 may be associated with a merchant, or other entity, providing search services. For example, the server system 102 may host a search engine or a site hosted by a merchant to provide access to information about products and user opinions about products. For example, the server system may host or access a product database 112 storing a plurality of product records 114. The product records 114 may have one or more categories 116 associated therewith. For example, the product records 114 may be leafs nodes of a taxonomy including nodes representing product categories and subcategories. Accordingly, the categories 116 for a product record may be associated with the product due to its position in the taxonomy or due to a path describing categories and subcategories to which the product belongs stored as part of the product record 114. A product record 114 may also have one or more departments 118 associated therewith, or, in other words, may belong to one or more departments 118. A department may represent a top-level category, i.e. "vertical," of a product taxonomy. For example, departments may include "electronics," "clothing," "sporting goods," or the like.

The method described herein may make use of data known about an individual user when responding to user queries. Accordingly, the server system 102 may host or access a database of user records 118 for a plurality of users that have submitted queries to the server system 102 or otherwise provided data to a merchant that can be used in responding to subsequent queries. For example, queries may be submitted by users from the user workstations 106.

The user record 120 for a particular user may include queries 122 previously submitted by the user associated with the user record 120. A query 122 may include text including one or more words, numbers, or combination thereof, or any other data structure or object that can be used to locate or identify a product or category of products. Each query 122 may have associated therewith one or more product clicks 124 identifying products selected by the user from among the search results for the query 122. In some embodiments, a query 122 may also include a record of a number of time a user or collection of users have entered that query 122 and performed a search based thereon.

Queries may be clustered according to methods described herein and these clusters 126 may then be used in order to identify relevant responses to user queries. In some embodiments, the queries 122, product clicks 124 of queries, and query clusters 126 are not specific to user and therefore are not part of a particular user record 120.

Figure 2:
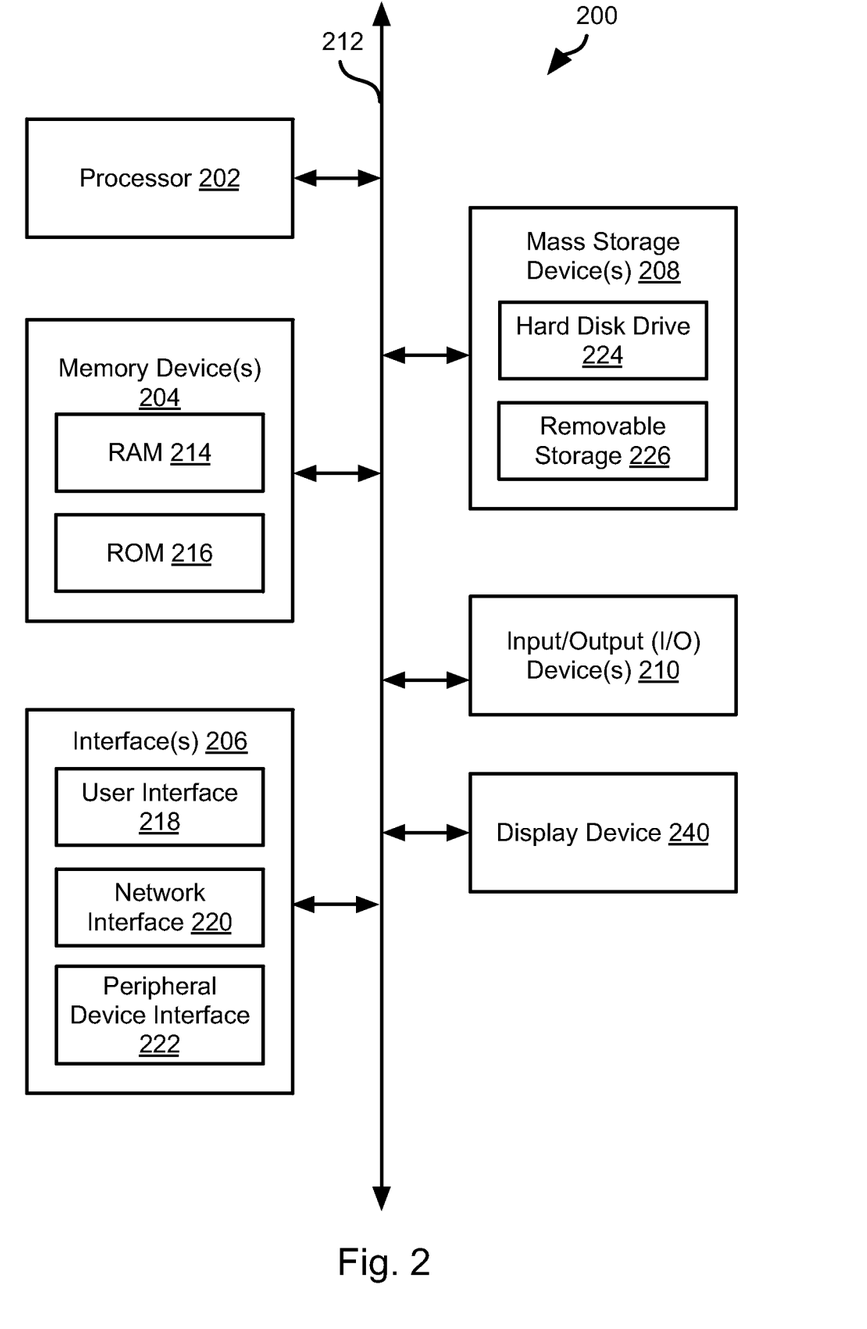
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, merchant workstation 104, and customer workstation 106, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more non-transitory mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface (s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
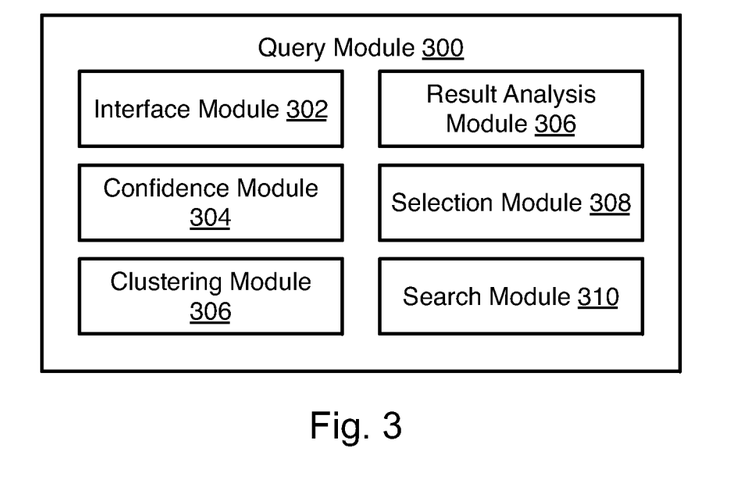
FIG. 3 is a schematic block diagram of modules implementing methods in accordance with embodiments of the present invention.

FIG. 3 illustrates a query module 300 including software and/or hardware modules implementing searching methods disclosed herein. In some embodiments, the modules and data of the query module 300 are implemented or accessed by the server system 102 or some other entity that provides an interface to the server system 102.

The query module 300 may include an interface module 302 for receiving queries and transmitting responses to queries to a requesting entity. The query module 300 may be part of a data flow such that a query input to the query module 300 is not received directly from, for example, the customer workstation 106. For example, a query may be expanded or otherwise modified to include keywords associated with concepts identified in the query. The query may also be generated by some other software module executed by the server system 102. Whichever entity originated a query received by the interface module 302, the interface module 302 may route the search results to this requesting entity or to some other entity specified with the query.

The query module 300 may include a confidence module 304. The confidence module 304 evaluates departments associated with search results and determine a confidence associated with some or all of the departments represented in the search results. A method for evaluating the confidence associated with a department will be described in greater detail hereinbelow.

A clustering module 306 identifies clusters among the queries for use in responding to queries according to methods described hereinbelow. An example method by which the clustering module 308 groups queries into clusters is also described hereinbelow.

The query module 300 may also include a result analysis module 306. As will be described in greater detail below, departments that are useful in identifying relevant search results may be determined in part based on a composition of a search results, specifically the number of product records corresponding to each department present in the search results. Accordingly, a result analysis module 306 may evaluate search results in order to facilitate this determination as described in greater detail below.

A selection module 308 may select departments for use in one or both of filtering search results, organizing search results, and presenting search results to users. The selection module 308 may select departments using outputs from some or all of the confidence module 304, clustering module 306, and result analysis module 306. A method used by the selection module 308 to select departments is described in greater detail hereinbelow.

A search module 310 may search a corpus of documents, such as a database of product records, websites accessible over the Internet, or other corpus and return results relevant to a particular query. The search module 310 may implement any search algorithm, e.g. search engine, known in the art for identifying documents relevant to a query, from a simple keyword matching search to a more complex search with word sense disambiguation, contextual searching, or other strategy for identifying relevant documents.

Figure 4:
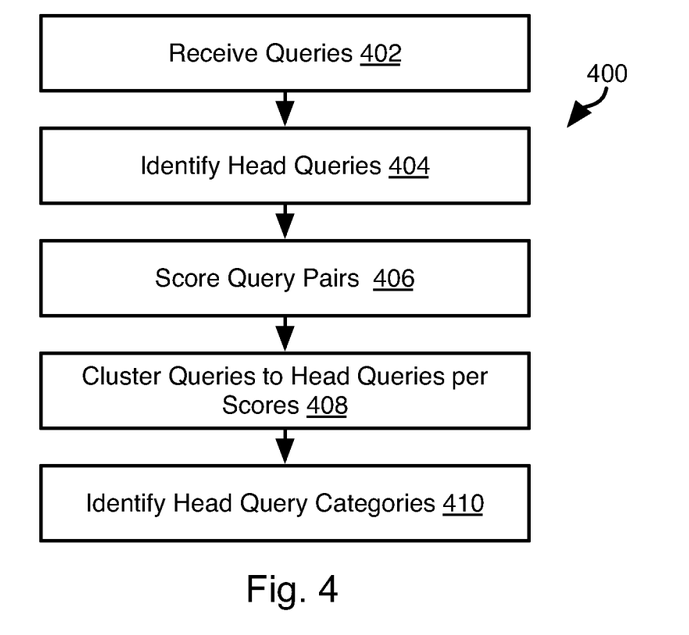
FIG. 4 is a process flow diagram of a method for clustering queries for a user in accordance with an embodiment of the present invention.

Referring to FIG. 4, a method 400 may be executed with respect to a plurality of queries. The method 400 may be executed by a server system 102 or executed elsewhere with an interface provided to the server system 102. The method 400 may be executed for a collection of queries and user responses to the search results thereof. The collection of queries may be queries authored by a single user, a group of users belonging to a common demographic group or other common interest or attribute, or users in general without any unifying attributes. The collection of queries may include at least a portion of all queries received over time by a server system 102 from any of these authors or queries for any of these authors provided to the server system 102.

The method 400 includes receiving 402 a collection of queries and identifying 404 a plurality of head queries. A head query may include a query that is most relevant to the author or authors of the collection of queries. For example, the top N queries that have the highest number of impressions may be identified 404 as the head queries. Impressions for a query may include a number of times an author or authors of the collection of queries have entered the query and performed a search using the query.

The method 400 may further include scoring pairs of queries of the collection of queries with respect to one another. In some embodiments, scores are calculated for pairs of queries including at least one head query and a secondary query (a query of the collection of queries other than the head queries). In other embodiments, scores may be calculated for pairs of queries including two secondary queries and/or two head queries. Scoring a pair of queries may include calculating a similarity between the queries. An example method for characterizing the similarity between two queries is described in greater detail below with respect to FIG. 6.

Using the scores calculated 406 for query pairs, the secondary queries are clustered 408 to at least one head query. In one embodiment, a secondary query is clustered 408 to only one head query. Various clustering techniques known in the art may be used to perform the clustering 408, such as k-means clustering, k-medians clustering, k-medoid clustering, other centroid clustering model, or other clustering technique. The value of k used for the clustering algorithm may be chosen to be equal to the number of head queries selected. The clustering step 408 may have as an optimization goal the assignment of each secondary query to the head query to which the secondary query has the largest similarity score. A secondary query associated with a head query may be referred to as a tail query of that head query.

In an alternative embodiment, the clustering 408 step is performed without regard to head queries and the queries of the collections are grouped into clusters according to a clustering algorithm having as an optimization goal adding each query to a cluster such that the mean similarity score of the query with respect to the other queries of the cluster is as small as possible. A head query may be identified for each cluster by selecting the query with the highest number of impressions.

As will be described in greater detail below, the categories associated with a head query may be used to enhance query results. Accordingly, in preparation for subsequent use of the query clusters, categories associated with the head queries may be identified 410. The categories associated with a query may include categories associated with product records returned for the query in past searches and which were selected (e.g. clicked on) by a user. An example method for associating categories with a head query is described in greater detail with respect to FIG. 5.

Figure 5:
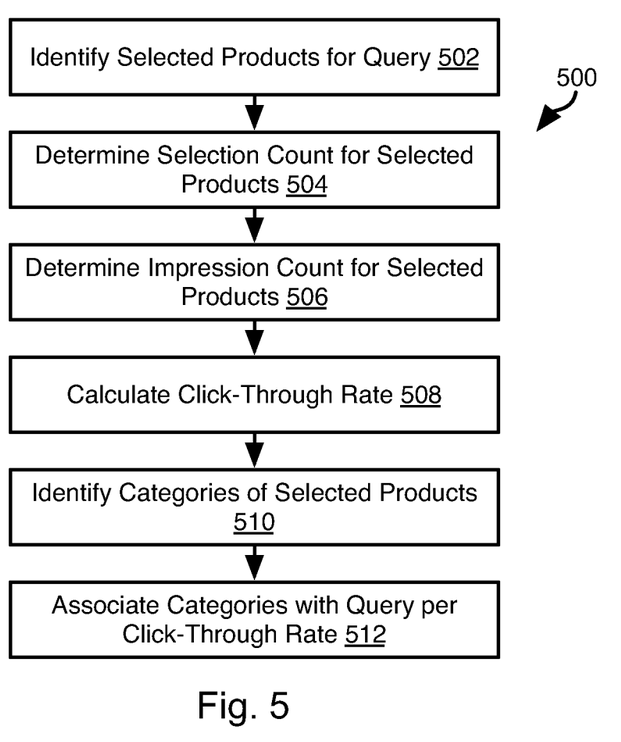
FIG. 5 is a process flow diagram of a method for associating categories with a query cluster in accordance with an embodiment of the present invention.

FIG. 5 illustrates a method 500 for identifying categories associated with a head query. The method 500 may be executed with respect to a query and take as additional inputs query results for various times in which the query has been input and user selections for the query results. The methods herein are particularly advantageously used with respect to product records that are associated with one or more nodes of a taxonomy representing categories and subcategories to which the product records belong. However, any document having one or more categories associated therewith or sufficient text to infer an associated category may also be processed in the same manner as product records as described herein.

The method 500 may include identifying 502 product records selected for the one or more instances in which the query was input by a user or any of a number of users. For these product records, a selection count may be determined 504 or retrieved. The selection count may include a count of a number of times the product record was selected for the query that is the subject of the method 500. In some embodiments, the selection count may include a count of a number of times the product record was selected from among search results for any query.

The impression count 506 for the identified 502 products may also be determined 506 or retrieved. An impression count for a product record may be the number of times the product record was included in search results for the query that is the subject of the method 500. In some embodiments, the impression count for a product record only counts as an impressions instances when the product record was included in the search result and was actually viewed by a user, e.g. transmitted as part of a web page rendered on a display device on a customer computing device 106 or other document representing the search results. The impression count determined 506 or retrieved at step 506 may include an impression count for the product record including a number of times the product record was included in search results for queries other than the query that is the subject of the method 500.

A click-through rate for the identified 502 product records may then be calculated 508 based on the determined 504 number of selections (e.g. clicks) and the determined 506 impression count. In a simple case, the click-through rate for the product record is proportional to the selection count divided by the impression count.

Categories may then be associated 512 with the query that is the subject of the method 500. For example, the top N identified 502 product records with the highest click-through rate may be evaluated to identify 610 categories associated therewith and these categories may be selected as the categories for the query. In some embodiments, the top M categories that occur most frequently among the top N product records are selected as the categories for the query. Where the product records are associated with a taxonomy, the categories of the product records may be ancestor nodes (e.g. categories and subcategories) of the product records in the taxonomy. Categories for a product record, or other document, may also be determined based on an explicit listing of such categories or by inferring categories based on the content of the product record. In some embodiments, click-through rates for product records may be known, such as by performing steps 504-510, at some point prior to receiving invocation of the method 500, such that only step 512 is performed post-invocation.

Figure 6:
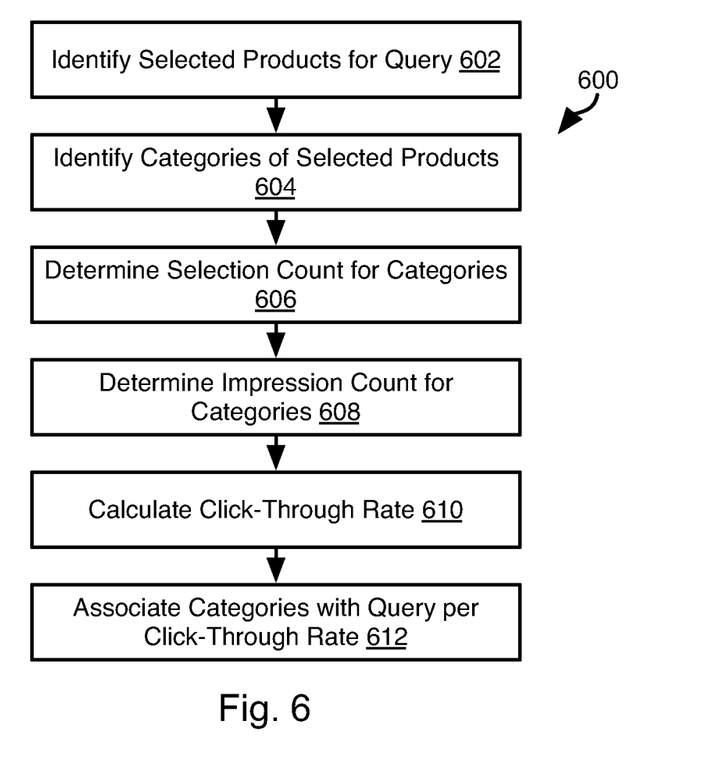
FIG. 6 is a process flow diagram of an alternative method for associating categories with a query cluster in accordance with an embodiment of the present invention.

FIG. 6 illustrates an alternative method 600 for identifying a category associated with a query, such as the head query of a cluster. The method 600 may be executed with respect to a query and take as additional inputs query results for various times in which the query has been input and user selections for the query results.

The method 600 may include identifying 602 product records selected for the one or more instances in which the query was input by a user or any of a number of users. For these product records, categories associated therewith may be identified 604. As noted above, where the product records are associated with a taxonomy, the categories of the product records may be ancestor nodes (e.g. categories and subcategories) of the product records in the taxonomy. Categories for a product record, or other document, may also be determined based on an explicit listing of such categories or by inferring categories based on the content of the product record.

For the identified 604 categories, a selection count may be determined 606 or retrieved. The selection count for a category may include a count of a number of times a product record belonging to the category was selected for the query that is the subject of the method 600. In some embodiments, the selection count may include a count of a number of times other, e.g. all other, product records belonging to the category were selected from among search results for any query of a user for which the methods herein are executed or a collection of users for which query data is used.

An impression count 608 for the categories associated with the identified 602 categories may also be determined 608 or retrieved. An impression count for a category may be the number of times a product record belonging toe the category was included in search results for the query that is the subject of the method 500. In some embodiments, the impression count for a category only counts as an impressions instances when a product record belonging to the category was included in the search result and was actually viewed by a user, e.g. transmitted as part of a web page rendered on a display device on a customer computing device 106 or other document representing the search results. The impression count determined 608 or retrieved for a category may include an impression count for product records belonging to the category including a number of times these product records were included in search results for queries other than the query that is the subject of the method 600.

A click-through rate for the identified 604 categories may then be calculated 610 based on the determined 608 number of selections (e.g. clicks) and the determined 610 impression count. In a simple case, the click-through rate for category is proportional to the selection count divided by the impression count.

Categories may then be associated 612 with the query that is the subject of the method 600. For example, the top N identified 604 categories with the highest click-through rate may selected as the categories associated 612 with the query that is the subject of the method 600. In some embodiments, click-through rates for categories may be known, such as by performing steps 606-610, at some point prior to receiving invocation of the method 600, such that only step 612 is performed post-invocation.

Figure 7:
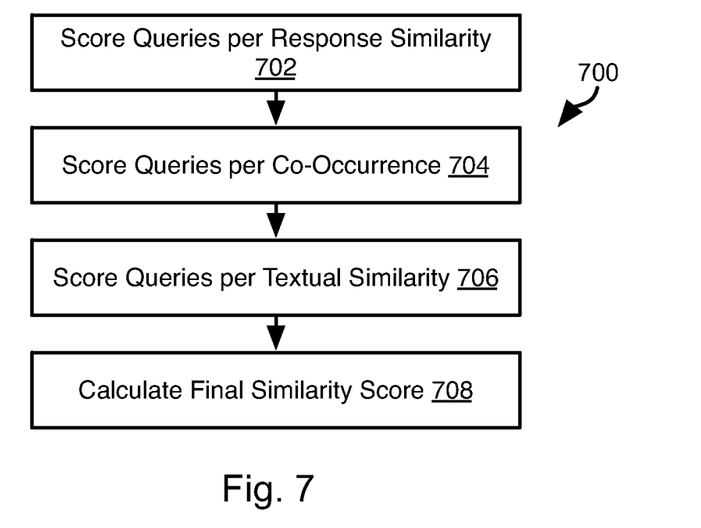
FIG. 7 is a process flow diagram of a method for assigning similarity scores to queries in accordance with an embodiment of the present invention.

FIG. 7 illustrates a method 700 that may be executed to determine the similarity between queries $q_1$ and $q_2$, such as between a secondary query and a head query or any other pair of queries.

The method 700 may include scoring 702 the queries according to response similarity. For example, $P_n$ may be defined as a vector of values having as entries $P_n[i]$ thereof a number of times a product i was clicked, or otherwise selected, by a user from among search results returned in response to the query $q_n$. A response similarity score may be based on the similarity of the vectors $P_1$ and $P_2$ for $q_1$ and $q_2$.

Any measure of similarity, such as a dot product or correlation may be used. In one embodiment, response similarity is calculated according to (1) or derived from the output of (1)

$$\text{Score} = \frac{P_1 \cdot P_2}{\sqrt{|P_1|^2} \sqrt{|P_2|^2}} \qquad (1)$$

The queries $q_1$ and $q_2$ may also be scored 704 according to co-occurrence. In a typical browsing situation, a user may invoke display of a merchant website on a customer workstation 106 and enter a number of queries into a search field thereof before navigating away from the website. The period of time between requesting display of the merchant website and navigating away from the merchant website, closing a browser displaying the merchant website, or other action that ends display of the merchant website, may be deemed a session. A session and actions occurring during a session may be reported by code executing in association with the merchant website executing on a customer workstation 106. A session may also be detected by the server system 102 or a webserver operated on behalf of the entity owning or controlling the server system 102 based on communications received form the customer workstation, or using any other method known in the art for detecting user interaction with a website.

Scoring queries according to co-occurrence similarity may include assigning a score to the queries $q_1$ and $q_2$ according to a frequency with which the queries $q_1$ and $q_2$ occur in the same session. For example, (2) or some other value based on freq$(q_1, q_2)$, where freq$(q_1, q_2)$ is a number of times that $q_1$ and $q_2$ occur together in search a session and freq$(q_n)$ is a frequency with which $q_n$ occurs in any session. The values of freq$(q_1, q_2)$ and freq$(q_n)$ may be a raw count of co-occurrence and occurrence, respectively.

$$\text{Score} = \frac{freq(q_1, q_2)}{freq(q_1) + freq(q_2)} \qquad (2)$$

The method 700 may further include scoring 706 textual similarity between $q_1$ and $q_2$. Textual similarity may be evaluated using any metric of textual similarity, such as edit distance, including any algorithm for calculating the edit distance between strings of text or array of tokens. The queries $q_1$ and $q_2$ may be processed prior to scoring textual similarity, such as by performing one or both of query normalization and query stemming.

Two or more of the above scores may then be combined to calculate 708 a final score. Combination may include summing, averaging, weighting, and summing, multiplying, or any other mathematical function based on two or more of the above-mentioned similarity scores.

In some embodiments, a logistic regression model is used to combine two or more similarity scores using (3), where Score(i) is any one of the similarity scores described above, and $w_i$ is a weight assigned to that score and $w_0$ is a constant that may be zero. The weights $w_0$, wi may be calculated using logistic regression or some other machine-learning method based on training data, such as training data generated according to human judgment. For example, training data may include entries including pairs of queries known to be synonymous or determined by human judgment to correspond to the same product records as inputs and a high similarity score as an output. Training data may also include pairs of queries that are different from one another and a low similarity score associated therewith.

$$FinalScore(Q_1, Q_2) = \frac{1}{1 + e^{-w_0 - \sum Score(i) * w_i}} \qquad (3)$$

The final score for a pair of queries may have a magnitude that increases with a degree of similarity between the queries.

In order to adapt the similarity score for use in a clustering algorithm a "distance" between queries may be calculated, where the distance decreases with the degree of similarity. For example, the distance D between queries $q_1$ and $q_2$ for use in clustering of queries as described above may be calculated according to $D(q_1, q_2)=1-\text{FinalScore}(q_1, q_2)$.

Figure 8:
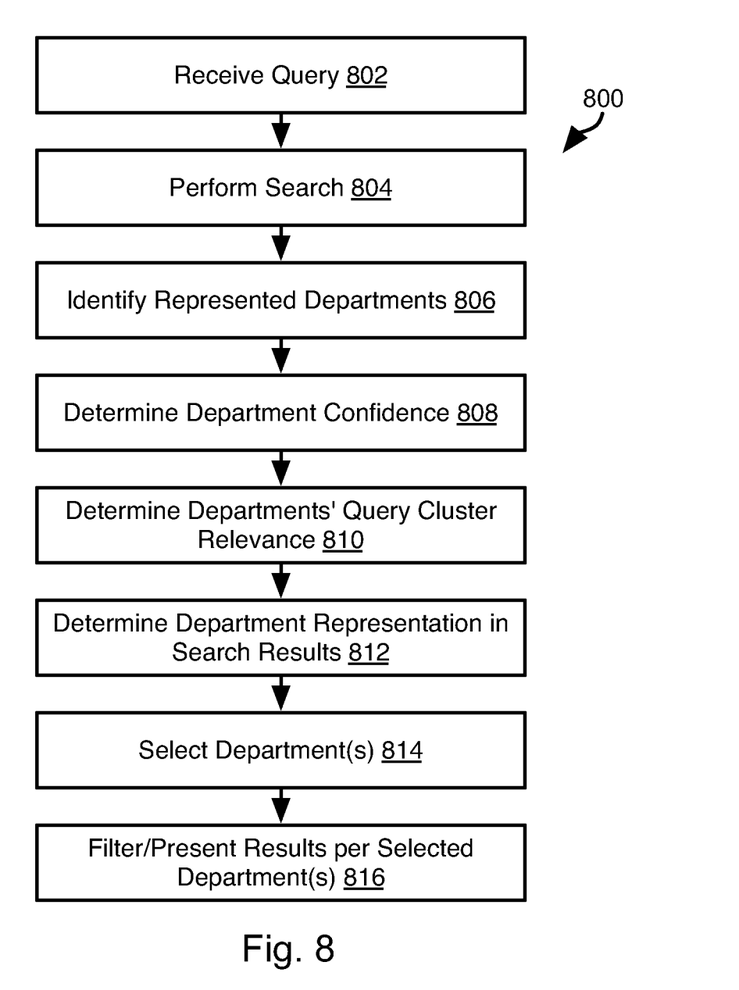
FIG. 8 is a process flow diagram of a method for selecting departments for presenting search results in accordance with an embodiment of the present invention.

FIG. 8 illustrates a method 800 for identifying relevant search results in response to a user query. The method 800 may be executed by a server system in response to a query received from a user computing device 106. For purposes of this disclosure references herein to communication with a user refers to communication with a user computing device 104 associated with the user.

The method 800 may include receiving 802 a query from a user and performing 804 a search based on the query. The search may be performed on any document corpus using any search engine or search algorithm known in the art. In particular, the search may be formed on a database of product records using any search algorithm known in the art.

A plurality of departments represented by the results of the search may be identified 806. For example, where the search results are a plurality of product records, the departments to which each product record belongs may be evaluated and a list of each department occurring at least once, or above a threshold number of times, in the search results may be identified 806. A department may be defined as described herein above with respect to FIG. 1.

A confidence score associated with the identified 806 departments may be determined 808. The confidence score for a department may represent the likelihood that filtering search results based on the department will enhance the relevance of the search results. A confidence score may indicate a likelihood that product records corresponding to the department are relevant to a user. In some embodiments, the confidence score may be a measure of popularity of a department as measured by popularity of product records belonging to the department when included in search results. For example, the confidence score may be based on a click-through rate for search results related to the department, e.g. a number of times users have clicked or otherwise selected a search result belonging to the department and a number of time search results belonging to the department have been presented to users.

In some embodiments, a confidence score CS is calculated according to (1), $$CS = ctr - Z\sqrt{ctr*(1-ctr)/N} \qquad (1)$$

where ctr is a ratio of user selections of search results belonging to the department to a number of search results belonging to the department that have been presented to users, N is the number of a number of search results belonging to the department that have been presented to users, and Z is an arbitrary constant. Where Z is equal to 1.96, for example, the confidence interval for (1) is 95%.

The method 800 may further include determining 810 one or more departments associated with one or more clusters that are relevant to the received 802 query. Determining 810 one or more departments for one or more or more relevant clusters may include identifying cluster having a tail query or head query that is most similar to the received query. Similarity may be measured using one or more of the co-occurrence similarity, response similarity, and textual similarity, or combination thereof as described hereinabove.

Once a relevant cluster has been identified, the relevance of identified 806 departments associated with the cluster may be determined or retrieved. For example, categories associated with a cluster may be known, such as by using the methods of FIG. 5 or 6. One or more departments relevant to the categories of the relevant cluster may then be identified. For example, as noted above, departments may represent one or more top-level nodes of a taxonomy. Accordingly, a department relevant to a category may be the department that has the category as a descendent node in the taxonomy. Alternatively or additionally, a department relevant to a category may be one for which an above-threshold amount or percentage of product records belonging to the category are also belong to the department. Those of the identified 806 departments that are found to be relevant to the relevant cluster may be those determined 810 to have query cluster relevance.

The method 800 may further include determining the degree representation of each identified 806 department in the search results from the performed 804 search. This may include counting the number of product records belonging to each represented department.

Using some or all of the confidence determined 808 for the represented departments, the determined 810 relevance of the represented departments to a relevant query cluster, and the determined 812 degree of representation for the represented department, a subset of the represented departments may be selected 814. For example, a combination or weighted combination of any of the determined 808-812 metrics may be used to rank each department and the N highest ranked departments may be selected 814. Where weightings are used, logistic regression, machine learning, and/or a heuristic approach may be used to determine the weightings.

Using the selected 814 departments the results of the performed 804 search may be filtered or otherwise presented to the user from whom the query was received. For example, the search results may be filtered to obtain a filtered set of product records that all belong to at least one of the selected 814 departments. The filtered set of product records may then be returned to the user from whom the query was received. In some embodiments, the filtered set may be included with data defining an interface that include user interface elements representing some or all of the represented departments that do not belong to the filtered set. The interface data may invoke display of search results belonging to one or more of these departments upon interaction by the user with one of these user interface elements. For example a link may be included in an interface definition, such as a web page representing the search results. The link may simply display a department name or may include an instruction to click the link to obtain search results belonging to the department name. Upon selecting this link, an instruction may be transmitted to the server system 102 to provide the search results corresponding to the selected brand. The server system 102 may then return these search results to the user. In other embodiments, search results are returned to the user for both selected and non-selected brands, and selecting the interface element for a brand invokes display of already-received search results corresponding to the brand on the customer workstation 106.

Figure 9:
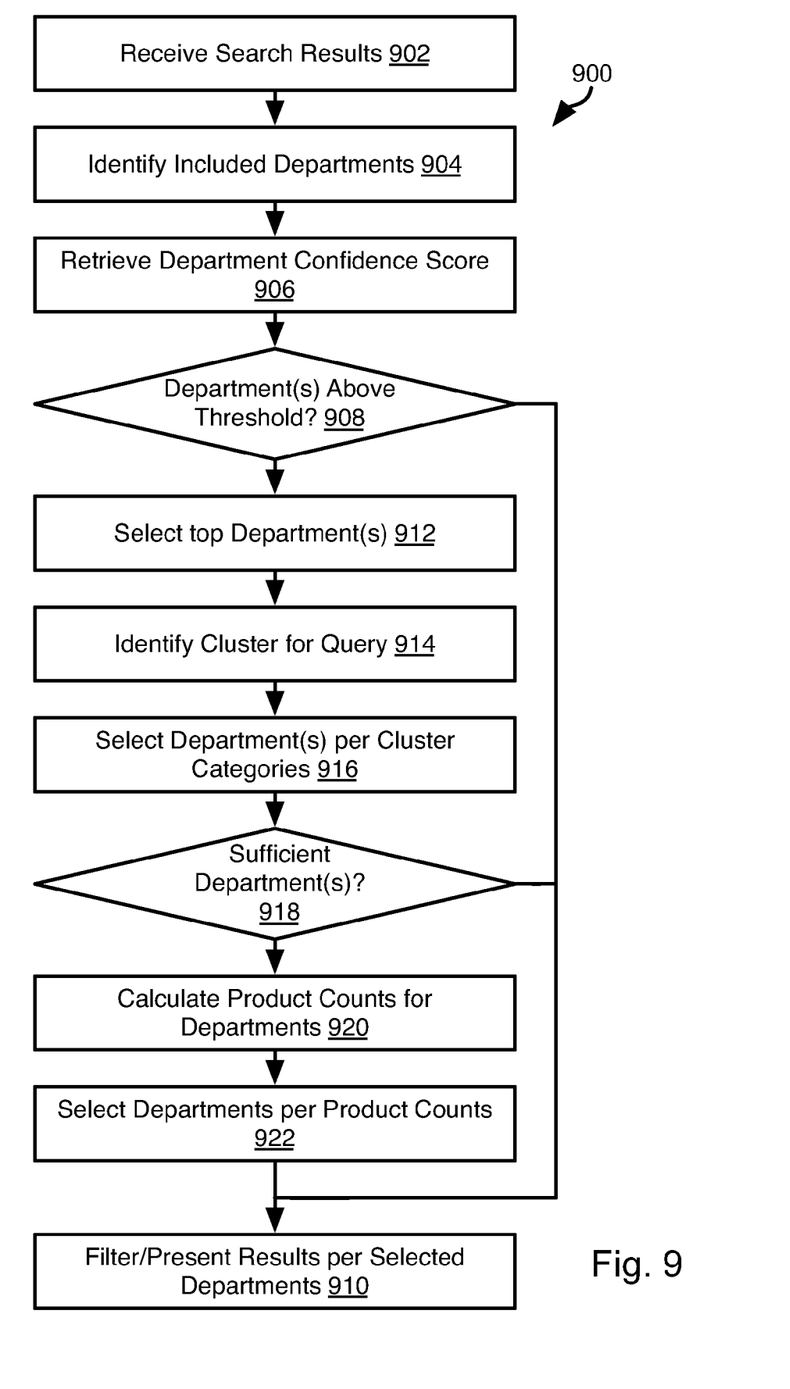
FIG. 9 is a process flow diagram of an alternative method for selecting departments for presenting search results in accordance with an embodiment of the present invention.

FIG. 9 illustrates an alternative method 900 for identifying relevant departments for search results. The method 900 may include receiving 902 search results for a query received from a user, such as from a search engine to which the query was submitted. As noted above, the corpus searched may include a product record database or some other corpus. As for the method 900, the each department represented by at least one search result may be identified 904, the "represented departments." Confidence scores for the represented departments, or those represented departments having an above-threshold representation, may be retrieved 906 or calculated. The confidence scores for the represented departments may be calculated in the same manner as for the method 800.

The method 900 may include evaluating 908 whether the confidence scores for one or more departments meeting a threshold condition, such as being greater than a threshold value. If so, then those departments having confidence scores meeting the threshold condition may be used to filter 910 and/or represent the search results that will be presented to a user. The manner in which search results are presented to a user and the interface in which they are presented may be the same as for the method 800 of FIG. 8. In some embodiments, all departments meeting the threshold condition are used to filter 910 and present search results. In other embodiments, less than all of these departments are used, such as only the department with the highest confidence score is used. In others, the top N departments with the highest confidence scores.

If no represented department is found 908 to have a confidence score meeting the threshold condition, the method 900 may include selecting some or all of the represented departments with the highest confidence scores, e.g. the top N represented departments. In other embodiments, where no department meets the threshold condition, the confidence scores may be ignored for purposes of selecting departments from among the represented departments.

The method 900 may include identifying 914 a query cluster relevant to the query that is the subject of the method 900. Identifying 914 a relevant query cluster may include finding the query clustering including a query with highest similarity to the received query, such as in the same manner as for the method 800.

Some or all departments in the represented departments that corresponds to the relevant query may then be selected 916. Identifying which departments correspond to the identified 914 query cluster may be performed in the same manner as described above with respect to the method 800.

The method 900 may include evaluating 918 whether the selected 916 departments meet a threshold condition. In some embodiments, the method 900 includes evaluating 918 whether the combination of the selected 912 and selected 916 departments meet a threshold condition. If so, then step 910 may be performed with respect to the selected 916 departments in one embodiment or with respect to both the selected 912 and selected 916 departments in another.

If the number of departments is not found 918 to meet the threshold condition, the method 900 may include calculating 920 product counts for the represented departments, e.g. the number of search results corresponding to each represented department. One or more departments may be selected 922 based on these product record counts to add to those already selected 916, or selected 912,916. For example, the top M departments with the highest product counts may be selected, where M is a fixed number or the number required to bring the already selected 916, or selected 912,916, departments up to some threshold value.

The departments selected according to some or all of steps 912, 916, and 920 may then be used to filter 910 and/or otherwise present the search results to a requesting user as described above.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for searching, the method comprising:

receiving, by a computer system, a query;

identifying, by the computer system, a plurality of documents relevant to the query;

identifying, by the computer system, a plurality of departments associated with the plurality of documents;

selecting, by the computer system, one or more selected departments from the plurality of departments according to confidence scores associated with the plurality of departments;

adding, by the computer system, one or more additional departments to the one or more selected departments if the confidence scores of the one or more selected departments do not meet a threshold condition; and transmitting, by the computer system, a representation of the plurality of documents in accordance with the one or more selected departments;

wherein adding, by the computer system, the one or more additional departments to the one or more selected departments if the confidence scores of the one or more selected departments do not meet a threshold condition further comprises:

receiving a plurality of queries from a plurality of users;

grouping the plurality of queries into a plurality of query clusters according to a textual similarity of the plurality of queries to one another based on the textual similarity, a similarity of search, and a co-occurrence within a same browsing session;

for each cluster of the plurality of query clusters, identifying an associated department having search results for the plurality of queries of the each cluster belonging thereto with a highest click-through rate as compared to other departments having search results for the plurality of queries of the each cluster;

identifying a selected query cluster of the plurality of query clusters corresponding to the query based on the textual similarity of the plurality of queries of the each cluster to the query; and adding the associated department of the selected query cluster to the one or more selected departments.

2. The method of claim 1, further comprising, if a number of the one or more selected departments does not exceed a minimum value, adding one or more high-document-count departments to the one or more selected departments, the high-document-count departments having a high number of documents corresponding thereto among the plurality of documents relative to other departments of the plurality of departments.

3. The method of claim 1, wherein adding, by the computer system, the one or more additional departments to the one or more selected departments if the confidence scores of the one or more selected departments do not meet the threshold condition further comprises adding one or more high-document-count departments to the one or more selected departments, the high-document-count departments having a high number of documents corresponding thereto among the plurality of documents relative to other departments of the plurality of departments.

4. The method of claim 1, wherein the confidence score for a department of the plurality of departments is calculated according to a click-through rate for search results corresponding to the department.

5. The method of claim 1, wherein a confidence score CS for a department of the plurality of departments is calculated according to $$CS = ctr - Z\sqrt{ctr*(1-ctr)/N}$$

where ctr is a ratio of user selections to user impressions corresponding to the department, N is a number of the user impressions corresponding to the department, and Z is an arbitrary constant.

6. The method of claim 5, wherein Z is greater than or equal to 1.96.

7. The method of claim 1, wherein transmitting, by the computer system, the representation of the plurality of documents in accordance with the one or more selected departments further comprises:
transmitting those documents of the plurality of documents corresponding to the one or more selected departments.

8. The method of claim 1, wherein transmitting, by the computer system, the representation of the plurality of documents in accordance with the one or more selected departments further comprises:
transmitting data defining an interface presenting those documents of the plurality of documents corresponding to the one or more selected departments and interface elements to invoke display of those documents of the plurality of documents corresponding to a department other than one of the one or more selected departments.

9. A system for searching, the system comprising one or more processors and one or more memory devices coupled to the one or more processors, the one or more memory devices storing executable and operational code effective to cause the one or more processors to:
receive a query;
identify a plurality of documents relevant to the query;
identify a plurality of departments associated with the plurality of documents;
select one or more selected departments from the plurality of departments according to confidence scores associated with the plurality of departments;
add one or more additional departments to the one or more selected departments if the confidence scores of the one or more selected departments do not meet a threshold condition; and
transmit a representation of the plurality of documents in accordance with the one or more selected departments;
wherein the executable and operational code are further effective to add the one or more additional departments to the one or more selected departments if the confidence scores of the one or more selected departments do not meet a threshold condition by:
receiving a plurality of queries from a plurality of users;
grouping the plurality of queries into a plurality of query clusters according to a textual similarity of the plurality of queries to one another based on the textual similarity, a similarity of search, and a co-occurrence within a same browsing session;
for each cluster of the plurality of query clusters, identifying at least one associated department having search results for the plurality of queries of the each cluster belonging thereto with a higher click-through rate as compared to other departments having search results for the plurality of queries of the each cluster;
identifying a selected query cluster of the plurality of query clusters corresponding to the query based on the textual similarity of the plurality of queries of the each cluster to the query; and
adding the at least one associated department of the selected query cluster to the one or more selected departments.

10. The system of claim 9, wherein the executable and operational code are further effective to cause the one or more processors to, if a number of the one or more selected departments does not exceed a minimum value, add one or more high-document-count departments to the one or more selected departments, the high-document-count departments having a high number of documents corresponding thereto among the plurality of documents relative to other departments of the plurality of departments.

11. The system of claim 9, wherein the executable and operational code are further effective to cause the one or more processors to add the one or more additional departments to the one or more selected departments if the confidence scores of the one or more selected departments do not meet a threshold condition by adding one or more high-document-count departments to the one or more selected departments, the high-document-count departments having a high number of documents corresponding thereto among the plurality of documents relative to other departments of the plurality of departments.

12. The system of claim 9, wherein the confidence score for a department of the plurality of departments is calculated according to a click-through rate for search results corresponding to the department.

13. The system of claim 9, wherein the confidence score CS for a department of the plurality of departments is calculated according to $$CS = ctr - Z\sqrt{ctr*(1-ctr)/N}$$

where ctr is a ratio of user selections to user impressions corresponding to the department, N is a number of the user impressions corresponding to the department, and Z is an arbitrary constant.

14. The system of claim 13, wherein Z is greater than or equal to 1.96.

15. The system of claim 9, wherein the executable and operational code are further effective to cause the one or more processors to transmit the representation of the plurality of documents in accordance with the one or more selected departments by transmitting those documents of the plurality of documents corresponding to the one or more selected departments.

16. The system of claim 9, wherein the executable and operational code are further effective to cause the one or more processors to transmit the representation of the plurality of documents in accordance with the one or more selected departments by:
transmitting data defining an interface presenting those documents of the plurality of documents corresponding to the one or more selected departments and interface elements to invoke display of those documents of the plurality of documents corresponding to a department other than one of the one or more selected departments.

* * * * *